United States Patent
Hirth et al.

(10) Patent No.: US 8,182,753 B2
(45) Date of Patent: May 22, 2012

(54) CARRIER BODY FOR EXHAUST-GAS AFTERTREATMENT WITH DISPERSED CATALYST CONFIGURATION, PROCESS FOR PRODUCING A CARRIER BODY AND EXHAUST GAS TREATMENT UNIT AND VEHICLE HAVING A CARRIER BODY

(75) Inventors: Peter Hirth, Rösrath (DE); Thomas Härig, Neunkirchen-Seelscheid (DE); Rolf Brück, Bergisch Gladbach (DE); Holger Stock, Lohmar (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 727 days.

(21) Appl. No.: 12/269,092

(22) Filed: Nov. 12, 2008

(65) Prior Publication Data
US 2009/0104089 A1 Apr. 23, 2009

Related U.S. Application Data

(63) Continuation of application No. PCT/EP2007/004037, filed on May 8, 2007.

(30) Foreign Application Priority Data

May 12, 2006 (DE) .......................... 10 2006 022 364

(51) Int. Cl.
*B01D 50/00* (2006.01)
(52) U.S. Cl. ........................................ 422/180; 422/177
(58) Field of Classification Search .................. 422/177, 422/180
See application file for complete search history.

(56) References Cited

U.S. PATENT DOCUMENTS

| 5,371,056 | A | 12/1994 | Leyrer et al. | |
|---|---|---|---|---|
| 6,752,969 | B1 | 6/2004 | Nishimura et al. | |
| 7,250,385 | B1 | 7/2007 | Ohno et al. | |
| 2002/0045541 | A1* | 4/2002 | Koike et al. | 502/251 |
| 2003/0012974 | A1* | 1/2003 | Iwami et al. | 428/606 |
| 2003/0092569 | A1* | 5/2003 | Koike et al. | 502/325 |
| 2006/0068159 | A1 | 3/2006 | Komori et al. | |
| 2008/0268232 | A1* | 10/2008 | Saxena et al. | 428/325 |

FOREIGN PATENT DOCUMENTS

| DE | 41 32 534 A1 | 4/1993 |
|---|---|---|
| DE | 44 33 328 A1 | 4/1995 |
| DE | 199 57 311 A1 | 5/2000 |
| EP | 0 566 878 A1 | 10/1993 |
| EP | 1 243 335 A1 | 9/2002 |
| EP | 1 384 508 A1 | 1/2004 |
| EP | 1 538 133 A1 | 6/2005 |
| JP | 2006305406 A * | 11/2006 |

OTHER PUBLICATIONS

International Search Report, dated Sep. 12, 2007.

* cited by examiner

*Primary Examiner* — Tom Duong
(74) *Attorney, Agent, or Firm* — Laurence A. Greenberg; Werner H. Stemer; Ralph E. Locher (57) ABSTRACT

A carrier body includes an overall surface having at least one coating portion with a catalytically active coating including at least one type of catalyst elements disposed in dispersed form at a surface of the carrier body. The catalyst elements have a mean spacing along the surface of at least 3 micrometers. The surface has a mean roughness depth $R_z$ of 2 to 10 micrometers. The carrier body has a maximum increase in pressure loss compared to a carrier body with a smooth and uncoated surface of 25%. A process for producing a carrier body and an exhaust gas treatment unit and a vehicle having a carrier body, are also provided.

21 Claims, 4 Drawing Sheets

CARRIER BODY FOR EXHAUST-GAS AFTERTREATMENT WITH DISPERSED CATALYST CONFIGURATION, PROCESS FOR PRODUCING A CARRIER BODY AND EXHAUST GAS TREATMENT UNIT AND VEHICLE HAVING A CARRIER BODY

CROSS-REFERENCE TO RELATED APPLICATION

This is a continuation, under 35 U.S.C. §120, of copending International Application No. PCT/EP2007/004037, filed May 8, 2007, which designated the United States; this application also claims the priority, under 35 U.S.C. §119, of German Patent Application DE 10 2006 022 364.0, filed May 12, 2006; the prior applications are herewith incorporated by reference in their entirety.

BACKGROUND OF THE INVENTION

Field of the Invention

The present invention relates to a carrier body for a catalytically active coating. Such carrier bodies are used, in particular, for the aftertreatment of exhaust gases in vehicles. The invention also relates to a process for producing a carrier body and an exhaust gas treatment unit and a vehicle having a carrier body.

In addition to other manifestations, such carrier bodies are, in particular, configured in such a way that they are constructed with at least one at least partially structured layer of a gas-impermeable material, so that there is a multiplicity of flow paths with a minimum cross section of 0.5 mm², with at least the majority of the flow paths being constructed with a plurality of passages to at least one adjacent flow path. The effectiveness of carrier bodies of that type in terms of the conversion of pollutants contained in the exhaust gas is influenced by a wide range of different criteria. Two main requirements are an effective mass transfer of the pollutants towards the catalytically active coating and a low back-pressure being generated in the exhaust-gas stream as a result of it flowing through the carrier body. It has been found that for improved mass transfer with a desired back-pressure, it is necessary to influence the flow mechanisms of the exhaust gas within the carrier body. In that context, it has emerged that a turbulent flow in the interior of the passages or flow paths leads to a significant increase in mass transfer. The formation of turbulent flows results in mass transfer coefficients which are a whole order of magnitude higher than those of other carrier bodies.

In order to further enhance the effectiveness of exhaust-gas treatment, it has become possible to effect a radial transverse exchange between the partial exhaust-gas flows from one channel to other channels in the catalytic converter, so that surfaces which have heretofore been unused can be exploited more effectively. That flow equalization can be achieved, for example, by perforated metal foils. Both the smooth and the corrugated foils are provided with holes with a large diameter which is, in particular, larger than the diameter of the channel. Those holes interrupt the channel wall and create the desired interaction between the individual partial exhaust-gas flows.

However, the altered flow conditions for the exhaust gas in the interior of the carrier body lead to altered conditions with regard to the chemical reactions for conversion of the pollutants. It has been discovered that despite the considerably improved mass transfer between the exhaust gas and the coating surface, the desired purification action or conversion rate cannot always be achieved.

SUMMARY OF THE INVENTION

It is accordingly an object of the invention to provide a carrier body for exhaust-gas aftertreatment with a dispersed catalyst configuration, a process for producing a carrier body and an exhaust gas treatment unit and a vehicle having a carrier body, which overcome the hereinafore-mentioned disadvantages and at least partially solve the problems of the heretofore-known products, processes and devices of this general type. In particular, the invention is intended to specify a carrier body having a coating which is adapted to the turbulent flow conditions in the interior of the carrier body and allows more effective conversion of pollutants in the exhaust gas. Furthermore, it is intended to specify a process for producing a coated catalyst carrier body which can achieve a particularly uniform coating, so that the latter has only a slight influence on the flow properties of the exhaust gas during operation.

With the foregoing and other objects in view there is provided, in accordance with the invention, a carrier body, comprising an overall surface including a surface region having at least one coating portion with a catalytically active coating including at least one type of catalyst elements dispersed at the surface region of the carrier body. The catalyst elements have a mean spacing along the surface region of at least 3 micrometers. The surface region has a mean roughness depth $R_z$ of 2 to 10 micrometers. The carrier body has a maximum increase in pressure loss of 25% compared to a carrier body with a smooth and uncoated surface region.

A wide range of different concepts can be used in the configuration of the carrier body. By way of example, it is possible to form monoliths through which a gas can flow and which have a defined number, position, etc. of flow paths. However, it is also possible for the monolith to be constructed with a random (chaotic) cavity structure, for example in the style of a foam or the like. A gas stream regularly penetrates through the carrier body, entering on one side and leaving again on one (different) side. The gas stream is passed through the material surfaces which delimit the flow paths and/or the cavity structure. The overall carrier surface includes the surface of these walls of the flow paths and the internal material surfaces and substantially coincides with what is known as the "geometric surface area" (GSA) of the carrier body.

At least part of this overall carrier surface is coated. It is also possible to provide a plurality of (different) coating portions. The term "catalyst element" is intended in particular to describe particle-like formations to which a mean size can be ascribed. The external configuration of the catalyst elements can be selected specifically according to application, with an approximately spherical form being preferred. These catalyst elements are now disposed in dispersed form on the surface (i.e. that part of the overall carrier surface which is disposed in the coating portion), which basically means that there should not be a continuous coating over the entire area. Rather, the catalyst elements are at least partially but preferably completely applied individually on or to the surface.

According to the invention, the catalyst elements are disposed on the surface in such a way that they have a mean spacing along the surface of at least 3 μm, preferably in a range of from 3 to 9 μm. The following should be noted with regard to the mean spacing: this term is intended first of all to mean a mean value as is present in a representative region of the coating portion. Furthermore, the spacing is a detail or portion along the surface, not a pure distance detail or portion. The mean spacing along the surface is comparable to the distance which the exhaust-gas stream has to cover along the surface as it flows from one catalyst element to an adjacent catalyst element. Depending on the size of the catalyst element, the mean spacing should at least be in a range of from the size (1×D) of the catalyst element to twenty times (20×D) the size (D) of the catalyst element. This, in particular, prevents the dispersely distributed catalyst elements from fusing together under ambient conditions involving high temperatures, thereby reducing the catalytically active surface area.

In order to particularly effectively prevent this fusion of catalyst elements, it is also a requirement that the surface have a mean roughness depth $R_z$ of from 2 to 10 µm, in particular from 3 to 6 µm. The mean roughness depth $R_z$ relates at least to a representative region of the coating portion, and if appropriate also to the entire surface. In the case of rolled surfaces, the mean roughness depth should, in particular, be taken longitudinally with respect to the rolling direction. The mean roughness depth $R_z$ is to be understood as meaning the arithmetic mean of a plurality of (generally 5) individual roughness depths which touch the distance between two parallels within an individual measurement section of a roughness profile at the highest and lowest points. In this roughness profile, the roughness peaks provide barriers which can initially lead to a preferred position of the catalyst elements, but in particular impedes fusion of the catalyst elements, while at the same time making a large part of the outer surface of the catalyst elements available for an effective chemical reaction at the surface. In this context, in particular a uniform configuration of the roughness profile is desirable at least in the coating portion.

For this purpose, it is also a requirement that the carrier body should have a maximum increase in pressure loss of 25%, in particular of at most 15%, compared to a carrier body with a smooth or uncoated surface. This can also indicate that the roughness depth $R_z$ is selected uniformly substantially with low tolerances, so that uniform conversion properties in the coating portion can be maintained even after long-term use of the carrier body. Furthermore, however, it is also ensured that the hydraulic diameter of the flow paths is reduced as a result of the formation of the roughness profile in such a way that the (in particular turbulent) flow properties of the exhaust gas are adversely affected. This therefore, in particular, indicates that the formation of the roughness profile is restricted to regions very close to the wall.

A smooth or uncoated surface is to be understood, in particular, as meaning the surface quality of the materials being used, which generally have a mean roughness depth $R_z$ (along the rolling direction) in the range of at most 1 µm (smooth). At least one carrier body having a surface of this type can be used as a reference. In order to determine the increase in pressure loss, exhaust gases at a temperature of 900° C. should flow through the reference carrier body or the carrier body with a smooth or uncoated surface at a mass flow of 550 kg/h, with the pressure in the test exhaust system downstream of the carrier body being 1.25 bar. The pressure drop over the carrier body is then determined, resulting, for example for a carrier body made from metallic foils in the style of a honeycomb body with a length of 118 mm, in a diameter of 110 mm and a channel density of 400 cpsi (cells per square inch), in a pressure loss of approximately 69 mbar. In order to test the configuration of the surface according to the invention, the same carrier body with the required roughness profile is subjected to this procedure. A greater pressure drop can be detected due to the roughness profile and/or the coating. The increase in pressure drop which occurs is, however, to be restricted to at most 25%, which means that if this limit is exceeded, by way of example a more uniform roughness profile and/or a lower coating thickness is to be provided.

In the context of the invention, it has been discovered that in the case of carrier bodies which are particularly able to effect a turbulent flow of the gas in the interior, the catalyst elements which are usually disposed in deeper regions of the coating are no longer reached due to the slow mass transfer (diffusion). Therefore, an aim has been to apply the catalyst elements to the surface. For this purpose, a sufficiently large, long-term contact area between the catalyst elements and the exhaust-gas stream that is to be purified is ensured by requiring the catalyst elements to be disposed at a spacing, with the roughness profile forming barriers to contact between the catalyst elements. This makes it possible, for example, to effectively prevent the catalyst elements from changing shape during use in such a way that adjacent catalyst elements combine with one another, which would lead to a significant change in the mean size of the catalyst element, a less favorable ratio of volume to surface area of the catalyst element and would therefore reduce the efficiency of the catalyst carrier body. This is now counteracted.

In accordance with another feature of the invention, it is advantageous if the catalyst elements are disposed in a quantity of 0.2 to 2.0 grams per square meter ($g/m^2$) of the overall carrier surface. The quantity of 0.2 to 2.0 $g/m^2$ [grams per square meter] of the overall carrier surface is selected, in particular, for the treatment of exhaust gases for mobile internal combustion engines, for example for purifying gasoline or diesel exhaust gases. A range of from 0.4 to 0.8 $g/m^2$ is very particularly preferred for the precious metal catalyst platinum. If the loading is selected at a lower level, in the event of an unfavorable composition of the exhaust gas to be purified, inadequate conversion of the pollutants could occur under certain circumstances. If the loading exceeds the range indicated, the precious metal catalysts could be superimposed on one another, which does not bring about any further increase in the catalytic activity, but rather simply increases the production costs.

In accordance with a further feature of the invention, it is preferable for the type of catalyst elements to include a precious metal catalyst selected from the group consisting of platinum, palladium and rhodium. In particular, with these catalyst elements, the mean size of the catalyst element is preferably in the range of from 5 to 10 nanometers [nm].

In accordance with an added feature of the invention, in a preferred refinement of the carrier body with a catalytically active coating, the carrier body is constructed with at least one at least partially structured layer of a gas-impermeable material, so that there is a multiplicity of flow paths with a minimum cross section of 0.5 square millimeters [$mm^2$], with at least the majority of the flow paths being constructed with a plurality of passages to at least one adjacent flow path.

Accordingly, the carrier body is preferably a so-called honeycomb body, the flow paths of which are formed with a multiplicity of substantially straight channels disposed parallel to one another. These flow paths or channels may be formed by using one or more layers of gas-impermeable material. In this case, it is possible to provide completely structured and/or completely smooth layers, but it is also possible to use mixed layers with partially formed structures. With regard to the gas-impermeable material, it should be noted that this is generally a material which is resistant to corrosion and is able to withstand high temperatures. It is possible to use both (non-porous) ceramics, such as for example metal oxides, and metals which withstand these conditions.

Furthermore, it should be noted in this case that the flow paths are provided with a minimum cross section of 0.5 mm². This is to be understood, in particular, as meaning that these are not pores and/or undefinable, chaotic flow paths, but rather are flow paths which can be substantially clearly demarcated from one another. It is very particularly preferable for the minimum cross section to be at least 0.8 mm² or even 1.0 mm². In addition, it should be noted that this minimum cross section relates to a mean value over the entire length of the flow path, without taking into account internal fittings (indentations, guide vanes, etc.) which locally reduce the minimum cross section. In this context, the minimum cross section preferably relates specifically to the region of the flow paths in which there are no internal fittings, guide surfaces, narrowed flow paths and the like.

Furthermore, the majority of the flow paths has a plurality of passages to at least one adjacent flow path. It is advantageous for all of the flow paths to be provided with a plurality of passages. The passages can realize a connection to the directly adjacent flow path, for example by forming the passages in the layer itself, thereby allowing exhaust gas to flow through to the directly adjacent flow path. As an alternative or in addition, however, it is also possible for the passages to be produced by pure deformation of the layer, in which case, by way of example, the directly adjacent channel can be skipped over, with the exhaust gas instead penetrating into the flow path after the next. The passages have the function of ensuring that exhaust gas which flows through the carrier body in a preferred main direction of flow is diverted transversely to this main direction of flow and/or swirled up, so that the exhaust gas or the partial exhaust-gas streams can change flow paths a number of times.

At this point it is also proposed that at least one coating portion of the overall carrier surface be provided with a catalytically active coating. The coating portion may be part of a layer, but it is preferable for the entire carrier body to have a coating portion of this type over a portion of its axial extent. In other words, this also means that all of the flow paths are provided with a coating in a length portion (with respect to the carrier body located in the same portion of its axial extent). For example, it is conceivable for a coating portion of, for example, at most 30 mm or even just 20 mm, starting from the end side of the carrier body and into the depth of the latter, to be catalytically active. However, it is also possible, for example, for the entire overall carrier surface to be constructed with a catalytically active coating.

In accordance with an additional feature of the invention, the carrier body has at least one coating portion of the overall carrier surface which is provided with a catalytically active coating with a coating thickness of at most 15 micrometers [μm]. It has been discovered that the otherwise customary diffusion processes for converting pollutants in the exhaust gas as a result of the turbulent flows in the interior of the carrier body no longer take place in the accustomed way. The significant reduction in the coating thickness on one hand leads to an increased hydraulic diameter of the flow path, thereby producing a lower pressure loss with regard to the flow of exhaust gas through the carrier body. On the other hand, the coating can now be constructed with an adapted distribution of the catalytically active regions close to the surface, so that the catalytic conversion of the pollutants can be further improved there. Depending on the particular application or the type of flow path and/or the composition of the exhaust gas, it is also possible for the coating thickness to be significantly reduced, for example to at most 8 μm or to at most 1 μm.

In accordance with yet another feature of the invention, at least one precious metal catalyst selected from the group consisting of platinum, palladium and rhodium is provided only in a surface boundary layer with a boundary layer thickness of at most 1 micrometer [μm]. This means, in other words, that the precious metal catalyst is in practice provided only on the surface of the coating. The boundary layer thickness may advantageously be even smaller, for example at most 0.1 μm. Accordingly, the limitation of the boundary layer thickness illustrates how reactive the surface boundary layer is, avoiding doping of precious metal catalysts deep in the (inactive) interior.

In accordance with yet a further feature of the invention, the coating includes a porous storage layer, wherein in the at least one coating portion between 5 and 30 grams per square meter [g/m²] thereof are provided. A range of from 10 to 20 g/m² is very particularly preferred. The porous storage layer, in particular, provides an oxygen storage capacity, realized for example by a so-called washcoat [including $Al_2O_3$] or cerium oxide [CeO]. Storage layers of this type are used, in particular, if the exhaust gases to be purified contain only a small amount of oxygen, so that this component is stored for the chemical reactions in the storage layer. This storage layer advantageously has a coating thickness of at most 10 μm [micrometers], preferably only 6 μm, and is if appropriate substantially free of precious metal catalysts. If the exhaust gas from a diesel engine is to be treated, it is proposed to use a storage layer including a zeolite as a hydrocarbon storage device, while in the case of a gasoline engine it is proposed to use an oxygen storage device (cerium/zirconium oxide).

It may also be advantageous to provide more than two layers, for example a surface boundary layer with a precious metal catalyst having the indicated spacing from one another, an application-oriented storage layer and a barrier layer disposed in between, preventing undesirable interaction between the exhaust-gas components in the surface layer and the storage layer.

It should be noted that the structure of the coating itself, i.e. the configuration and shape of the coating components, may be of considerable relevance, and therefore it is considered advantageous for this coating to be applied to the carrier body or built up through the use of so-called microtechnology and/or nanotechnology. Microtechnology (also known as microstructuring technology) deals with processes for producing bodies and geometric structures with dimensions in the micrometer range (0.1 μm-1000 μm). Nanotechnology is used, for example, as a collective term for a wide range of technologies which deal with the production of objects and structures smaller than 100 nanometers (nm). These processes allow the coatings to be constructed in a more targeted and defined way.

In accordance with yet an added feature of the invention, the flow paths are at least partially delimited by a fabric of wire filaments. It is very particularly preferred to use a configuration in which the carrier body is formed with a predetermined number of completely structured layers and a corresponding number of fabrics made from metallic wire filaments, with the structured layers and the fabrics being disposed alternately with one another. In this case, the structure of the layer together with the fabric forms boundaries or walls for the flow paths. In view of the fact that the layer is constructed from a gas-impermeable material, it is possible, for example, to effect filtering of the partial gas streams flowing through the flow paths by using the structured layer to narrow the cross section of the flow paths, causing the partial gas stream to at least partially penetrate into the fabric or even through it. In view of the fact that the individual components of the carrier body are generally exposed to very considerable thermal and dynamic stresses, it is advantageous for both the layer and the fabrics to be produced from the same material. To clarify, it should be noted that the term "fabric" is to be understood in this case as a collective term for various types of a combination of wire filaments: a random configuration, a woven fabric, a knitted fabric, a nonwoven, etc., which may be hooked, welded, brazed, sintered, etc. together.

In accordance with yet an additional feature of the invention, the at least one at least partially structured layer includes a stainless steel foil. This is to be understood, in particular, as meaning a metal foil which contains approximately 18-22% by weight chromium, approximately 4.5-6% by weight aluminum, additions of titanium, yttrium and zirconium of between about 0.04 and 0.08% by weight, together with iron as the base. This material, which is resistant to corrosion and able to withstand high temperatures, has already proven suitable for known catalyst carrier bodies used in the automotive industry.

With such small coating thicknesses it is advantageous if the coating is securely fixed to the stainless steel foil and/or the fabric, to ensure a long service life of the carrier body. Therefore, it is also proposed that at least the wire filaments or the stainless steel foil, in the at least one coating portion, has a roughness depth $R_z$ in a range of from 2 to 6 μm [micrometers]. If, for example, a storage layer is provided on the stainless steel foil or the wire filaments, the roughness depth is advantageously in a range of from 2 to 3 μm. If a storage layer of this type were dispensed with and the catalysts were to be directly metered onto the surface of the wire filaments and/or the stainless steel foil, the roughness depth of the wire filaments and/or the stainless steel foil would be in a range of from 3 to 6 μm.

In accordance with again another feature of the invention, it is in this context particularly advantageous if at least the wire filaments or the stainless steel foil includes aluminum as a constituent, which is formed as a surface oxide in the at least one coating portion. It is preferable for both the wire filaments and the stainless steel foil to be formed with an aluminum oxide on the surface. This is to be understood, in particular, as meaning that the stainless steel foil or the wire filaments are heat-treated, so that aluminum oxide is formed on the surface from the aluminum which is present in the metal.

A suitable surface oxide (such as, in particular, so-called gamma or theta $Al_2O_3$), for example for the stainless steel foils specified below, can be achieved by treating the stainless steel foil with a thickness of 50 μm [micrometers] for 70 hours at 900° C. in air or at 925° C. in a gas mixture consisting of argon together with 4% by weight $H_2$ and 7% by weight $H_2O$. The stainless steel foils tested were in one case the material "Fecralloy" (Fe: 72.3% by weight; Cr: 22.0% by weight; Al: 5.10% by weight; Si: 0.42% by weight; Hf: less than 0.01% by weight; Mg: 0.003% by weight; Mn: 0.10% by weight; Ti: 0.051% by weight; Y: 0.074% by weight; Zr: 0.077% by weight; C: 0.048% by weight; S: less than 0.001% by weight; N: 0.0180% by weight; O: 0.0160% by weight) or "Aluchrom YHf" (Fe: 72.0% by weight; Cr: 20.5% by weight; Al: 5.39% by weight; Si: 0.29% by weight; Hf: 0.026% by weight; Mg: 0.008% by weight; Mn: 0.12% by weight; Ti: 0.005% by weight; Y: 0.041% by weight; Zr: 0.055% by weight; C: 0.035% by weight; S: 0.002% by weight; N: 0.0034% by weight; O: 0.0086% by weight). The precious metal catalyst was applied after formation of the surface oxides.

In accordance with again a further feature of the invention, in another preferred configuration of the carrier body, at least one precious metal catalyst selected from the group consisting of platinum, palladium and rhodium is applied directly to at least the wire filaments or the stainless steel foil. It is preferable for the precious metal catalysts to be applied substantially uniformly to the wire filaments and the stainless steel foil. A storage layer is not provided at this point. Therefore, the overall result is, for example, a coating height of less than 30 nm [nanometers], in particular in a range of from 0.5 to 20 nm.

In accordance with again an added feature of the invention, in order to ensure that the flow in the flow paths of the carrier body is as turbulent as possible, it is additionally proposed that each flow path has a length and over this length has passages at a repetition interval of at most 20 mm. In other words, a passage to an adjacent flow path is provided at least every 20 mm, advantageously even at most every 10 mm. It is particularly preferable for a diversion towards or a cross-mixing with different adjacent flow paths to be realized in successive repetition intervals.

In principle, to achieve a turbulent flow, it would be sufficient to provide a sufficient number of large passages in each flow path, which for example cannot become blocked during operation of the carrier body. However, in accordance with again an additional feature of the invention, it is particularly preferable to use a configuration in which at least some of the passages are assigned guide surfaces that project into the flow path. Guide surfaces of this type may be formed, for example, by punched-out formations or indentations in the layer in the (adjacent) region surrounding a passage. With regard to the extent to which the guide surfaces project, it is advantageous for the guide surface to block, for example, approximately 50 to 80% of the minimum cross section of the flow path and therefore to generate a corresponding dynamic pressure for the exhaust gas flowing through. As a result, the partial exhaust-gas flows are forced through preceding passages and/or the fabric.

In accordance with still another feature of the invention, in a refinement of the carrier body in which the passages are at least partially formed with holes in the at least one layer, the holes have a hole cross section of at least 25 square millimeters [mm²]. It is particularly preferable to use a configuration of the hole cross section of at least 50 mm². If the holes are, for example, round in form, preference is accordingly given to holes with a diameter of at least 8 mm [millimeters]. These large holes extend at regular intervals over the walls of a plurality of flow passages, so that adjacent walls are open simultaneously and a transverse flow is possible. Moreover, as the exhaust gas flows past the edge of the hole, it is diverted towards the hole, leading to a further division of the partial gas streams. This effect is improved as the cross section of the holes increases.

Furthermore, it is also proposed that at least half the layers be constructed with holes, in which case for each of these layers the sum of the open hole cross sections corresponds to at least 30% of a closed layer surface. This configuration is preferred, for example, if the carrier body is constructed with smooth and corrugated layers, in which case in particular, the smooth layers are constructed with holes and the corrugated layers provide passages with guide surfaces or indentations. The information that at least 30% of a closed layer surface is to be constructed with holes is intended to illustrate how many holes of this type are to be provided per layer. In particular, in the case of highly stressed carrier bodies or to ensure a sufficient surface area for the catalytically active coating to be placed on, the sum of the open hole cross sections should not exceed a value of 50% of the closed layer surface. The closed layer surface in this context, in particular, relates to the surface area of the layer if no openings were provided.

Very particular preference is given to a carrier body in which the flow path is configured in such a way that a gas flowing through it is turbulent over at least 80% of the length of the flow path. In this case, it is preferable for the majority, and very particularly preferably all, of the flow paths of the carrier body to be configured accordingly. The use of the coating according to the invention has proven especially suitable for these particularly turbulent gas flows.

With the objects of the invention in view, there is also provided a process for producing a carrier body having an overall surface including at least one coating portion with a catalytically active coating. The process comprises the following steps:
 a) providing a carrier body having a smooth surface;
 b) determining a pressure loss in the carrier body under predetermined ambient conditions;
 c) providing the surface with a mean roughness depth $R_z$ in a range of from 2 to 10 micrometers causing the carrier body to experience a maximum increase in pressure loss of 25%; and
 d) placing catalyst elements in a dispersed configuration with a mean spacing along the surface of at least 3 micrometers.

The process is suitable, in particular, for producing a carrier body as described above in accordance with the invention, and in this respect reference can at all points also be made to the above statements for further explanation.

Step a) includes, in particular, the provision of a metallic honeycomb body which is formed with at least one at least partially structured foil. Step b) is, in particular, carried out in the way which has already been explained above. Before step c) is carried out, the carrier body can at least partially be dismantled again and/or combined with other components. Moreover, in particular in the context of steps a), c) and/or step d), heat treatments (oxidizing, heating, etc.) of the carrier body and/or technical joining processes (welding, brazing, adhesive bonding, etc.) may be carried out. It is also possible for steps b) and c) to be repeated until a desired increase in pressure loss is present before step d) is commenced. However, it should still be noted that, in particular with a view to series production of carrier bodies of this type, step b) does not necessarily have to be carried out. For fixed boundary conditions, it can be assumed that the carrier bodies from step a) always have the same pressure loss and from step c) always have the same increase in pressure loss, and accordingly these characteristic variables no longer need to be determined individually.

In accordance with another feature of the invention, the process is particularly preferred if step c) includes at least one of the following processes:
 a) c1) machining the surface,
 b) c2) forming surface oxides,
 c) c3) coating the surface,
 d) c4) applying material to the surface region through the use of nanotechnology.

Under certain circumstances, it may be advantageous to carry out at least two of these processes, in which case the processes can also take place at different times in the sequence of the process.

Process c1) includes, for example, an abrasive treatment of the surface (grinding, scratching, etc.); step c2) relates, in particular, to the growth of aluminum oxides, as has already been explained above. Therefore, processes c1) and c2) are primarily working steps which involve a change in the roughness profile of the base material of the carrier body itself, whereas processes c3) and c4) relate to the application of an (identical) additional material. In the latter processes, coating processes which are known for exhaust-gas catalytic converters can be used, or alternatively it is possible to use the above-described microtechnology or nanotechnology application processes.

With the objects of the invention in view, there is furthermore provided an exhaust-gas treatment unit, comprising at least one carrier body according to the invention or produced by the process according to the invention.

With the objects of the invention in view, there is concomitantly provided a vehicle, comprising at least one exhaust-gas treatment unit having at least one carrier body according to the invention or produced by the process according to the invention.

With a view toward industrial applicability of a carrier body described in accordance with the invention and/or produced in accordance with the invention, reference is made, in particular, to an exhaust-gas treatment unit, for example in combination with a vehicle. Therefore, the invention also proposes a corresponding exhaust-gas treatment unit and a vehicle having at least one exhaust-gas treatment unit of this type.

Other features which are considered as characteristic for the invention are set forth in the appended claims, noting that the features listed individually in the claims can be combined with one another in any technologically suitable way so as to provide further configurations of the invention.

Although the invention is illustrated and described herein as embodied in a carrier body for exhaust-gas aftertreatment with a dispersed catalyst configuration, a process for producing a carrier body and an exhaust gas treatment unit and a vehicle having a carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
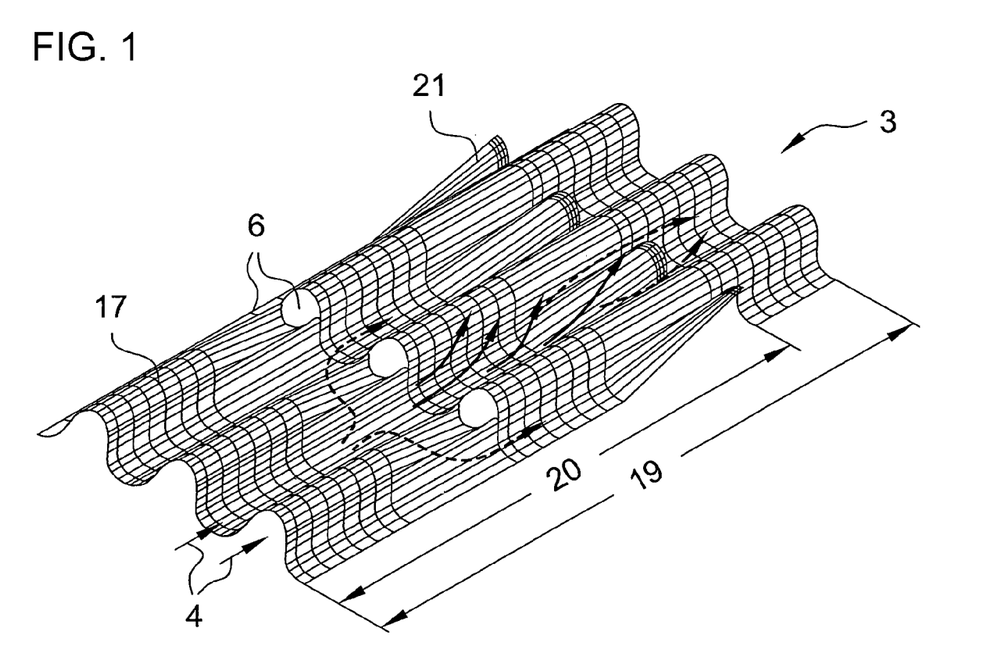
FIG. 1 is a diagrammatic, perspective view of a layer for a variant embodiment of the carrier body according to the invention.

Referring now to the figures of the drawings in detail and first, particularly, to FIG. 1 thereof, there is seen a perspective view of a first variant embodiment of a layer 3 which is provided with a corrugation structure that at least partially delimits flow paths 4. The flow paths 4 have a length 19 and, in the illustrated variant embodiment, a substantially rectilinear, parallel orientation of the flow paths 4 is provided. Passages 6 are provided in a corrugated stainless, high-grade or special steel foil 17 which forms the layer 3 at a predeterminable repetition interval 20. As is illustrated on the basis of the flow path 4 shown in the center, these passages 6 allow exhaust gas to pass into other flow paths 4, either only over guide surfaces 21 which have been pressed upwards or downwards or even through adjacent openings through the layer 3. When the flow path 4, which is indicated by arrows, is considered in more detail, it will be apparent that the exhaust-gas stream comes into contact with the guide surface 21 disposed in the flow path 4, which significantly narrows a minimum cross section of the flow path 4. Due to the resulting dynamic pressure, a large part of the partial exhaust-gas stream located in the flow path 4 is diverted upwards, with a non-illustrated fabric of metallic wire filaments preferably being provided at this location, which then filters or purifies the exhaust gas flowing through it. However, the dynamic pressure only builds up until it is possible for the exhaust gas to divert. This can be recognized on the basis of dashed arrows illustrated on the left. It should additionally be noted that the guide surface 21 does not completely close the flow path 4, so that a bypass flow (dashed arrows on the right in FIG. 1) is also possible there.

In particular, a configuration of this type having a fabric of wire filaments disposed above or below is also referred to as a bypass flow filter, since the partial exhaust-gas stream in each case has the possibility of flowing past each guide surface. Ultimately, however, it is desirable for the guide surfaces to be disposed in such a way that "statistically" all of the exhaust gas passes through a filter medium at least once. The particular advantage of this bypass flow filter is that it has a very low pressure loss. It can also achieve considerable conversion and filter rates.

Figure 2:
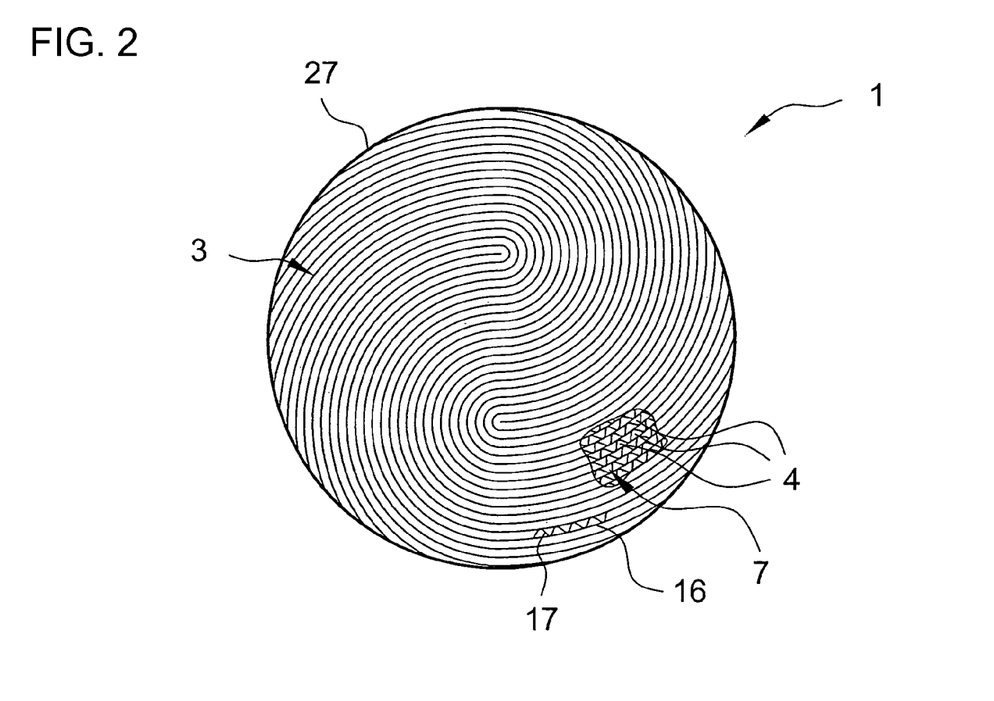
FIG. 2 is an end-elevational view of a further variant embodiment of the carrier body.

FIG. 2 illustrates a variant embodiment of a carrier body 1, with a plurality of smooth and structured layers 3 intertwined in an S shape and disposed in a housing 27. The layers 3 are formed by using smooth stainless, high-grade or special steel foils 16 and corrugated stainless, high-grade or special steel foils 17. Channels or flow paths 4 running substantially parallel to one another are formed between the smooth and corrugated stainless steel foils. Boundaries of the flow paths 4 represented by the stainless steel foils 16, 17 in total produce an overall carrier surface 7, which is also known as a geometric surface area or GSA.

Figure 3:
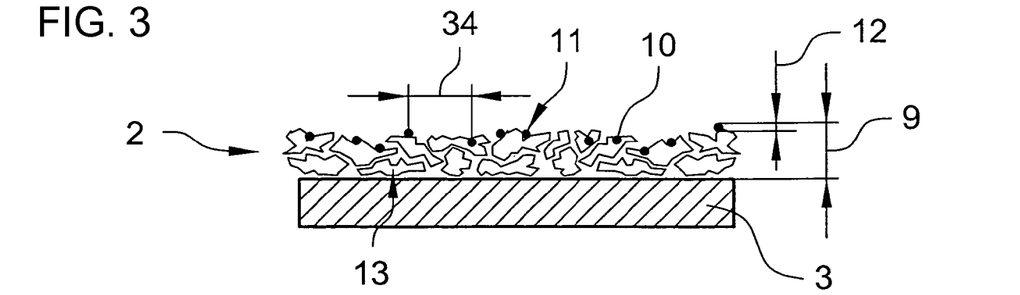
FIG. 3 is an enlarged, cross-sectional view of a first exemplary embodiment of a layer with a coating.

FIG. 3 now illustrates a portion of a first variant embodiment of a coating 2 which is formed on a layer 3. Overall, the coating 2 has a coating thickness 9 of at most 10 μm. It is formed by an outer surface boundary layer 11, which is in direct contact with the exhaust gas and has a boundary layer thickness 12 of at most 1 μm. Substantially all precious metal catalysts 10 are disposed in this surface boundary layer 11. Moreover, a porous storage layer 13 is provided between the surface boundary layer 11 and the layer 3. This storage layer may, for example, be formed by using gamma-$Al_2O_3$ (washcoat) or a mixture of gamma-$Al_2O_3$ with CeO and other oxides, in which case the layer thickness thereof is to be selected to be correspondingly smaller.

Figure 4:
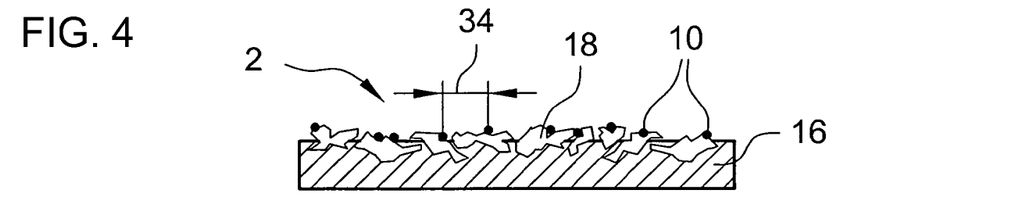
FIG. 4 is a cross-sectional view of a second exemplary embodiment of a layer with a coating.

FIG. 4 shows a further exemplary embodiment of the coating 2, with the layer 3 being formed by using a smooth stainless steel foil 16 which has a corresponding aluminum content. A surface oxide 18 is formed through the use of the aluminum that is present in the smooth stainless steel foil 16, if appropriate as an alternative or in addition with aluminum that is subsequently added, by using a suitable heat treatment. The surface oxide 18, for example, increases the roughness depth of the smooth stainless steel foil 16, so that the precious metal catalyst 10 can be permanently installed.

Figure 5:
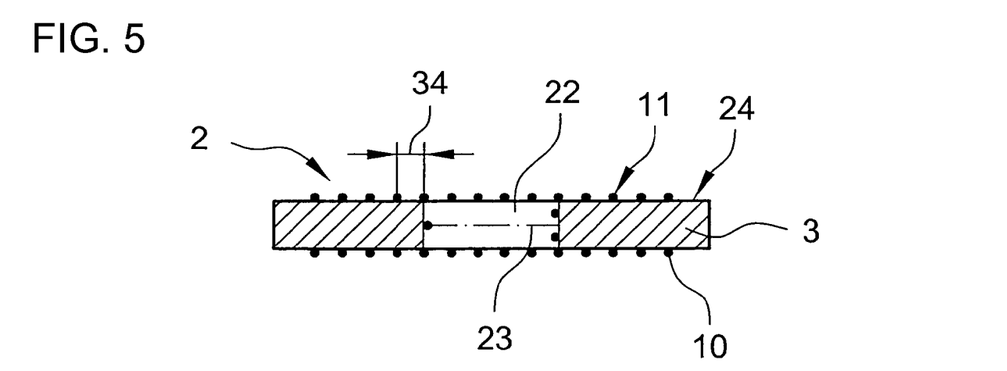
FIG. 5 is a cross-sectional view of a third exemplary embodiment of a layer with a coating.

In FIG. 5, the precious metal catalysts 10 have been applied directly to the layer 3. This limits the boundary layer thickness 12 of the surface boundary layer 11 (i.e. in particular the layer of the coating in which the precious metal catalyst 10 is disposed) or the total coating thickness 9 to a few nanometers. In this context it is preferable for the precious metal catalysts 10 to be distributed uniformly in the coating portion or on a layer surface 24. In this case, a hole 22 with a large hole cross section 23 is also illustrated in the layer 3, allowing flow exchange through the layer 3.

FIGS. 3 to 5 also illustrate a required spacing 34 between the individual precious metal catalysts 10.

Figure 6:
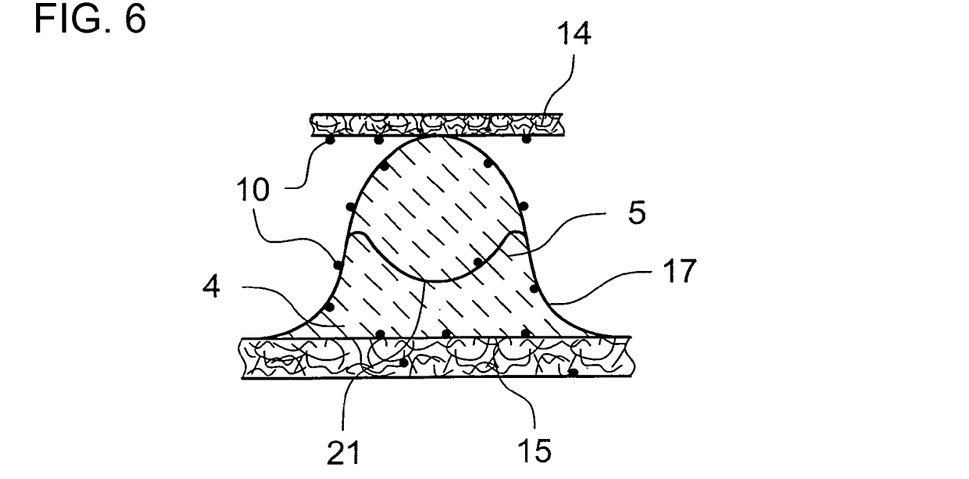
FIG. 6 is a fragmentary, cross-sectional view showing a variant embodiment of a flow path.

FIG. 6 diagrammatically depicts a portion of a variant embodiment of the flow path 4. The carrier body in this case is formed by an alternating configuration of fabrics 14 and a corrugated stainless steel foil 17. The flow path 4 is constructed with a minimum cross section 5 (hatched) of at least 0.5 $mm^2$. When determining the minimum cross section 5, the guide surfaces 21 projecting into the flow path 4 are not taken into account, but rather it is the total cross section at this point, as is present in large subregions of the flow path, which is used.

The fabrics 14 include wire filaments 15 which are constructed, for example, with a thickness of from 15 to 50 μm [micrometers]. The fabrics advantageously have a weight per unit area of from 200 to 1000 $g/m^2$ [grams per square meter] and a height of between 0.1 and 0.5 mm [millimeters]. The individual wire filaments 15 are welded together, and a corresponding or similar connection or joining is advantageously also provided between the fabric 14 and the corrugated stainless steel foil 17. Once again, the precious metal catalyst 10 for activating catalytic conversion of pollutants in the exhaust gas flowing past is provided directly on or in the fabrics 14 and on the corrugated stainless steel foil 17.

Figure 7:
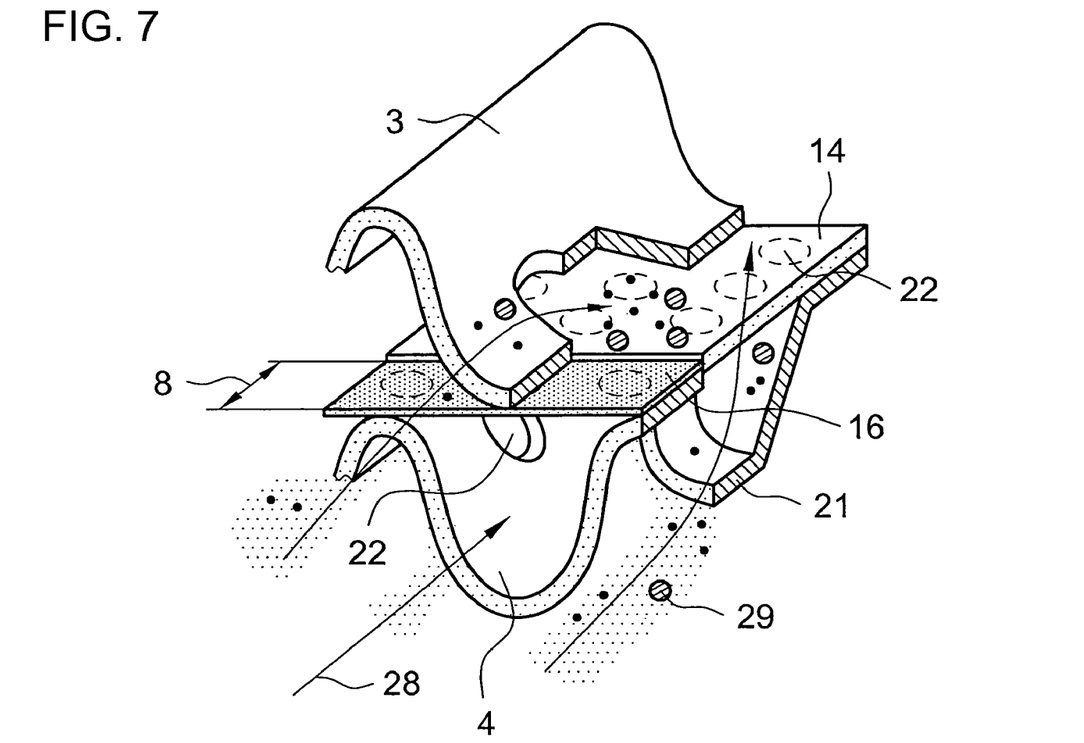
FIG. 7 is a fragmentary, partly broken-away, perspective view of a further variant embodiment of a carrier body according to the invention.

FIG. 7 illustrates a further fragmentary, perspective view of a configuration of a carrier body 1. The carrier body is once again formed with corrugated layers 3 between which a fabric 14 is provided. The layers 3 are provided with guide surfaces 21 for influencing the flow of the exhaust gas, which usually flows through the carrier body 1 in a main direction of flow 28 (as do entrained particulates 29). In this variant embodiment, only the corrugated layer 3 illustrated at the bottom is provided with a hole 22, but this is not imperative. The smooth layer disposed in between includes a composite material which encompasses a portion with a smooth stainless steel foil 16 and a further portion with a fabric 14. The two components are advantageously connected to one another by technical joining, in particular by welding. The illustration reveals that the smooth stainless steel foil 16 forms a coating portion 8, i.e. the catalytically active material is provided there. In this variant embodiment, the fabric 14 is constructed without a corresponding coating. Further non-illustrated holes 22 or passages may also be provided both in the smooth stainless steel foil 16 and in the fabric 14.

Figure 8:
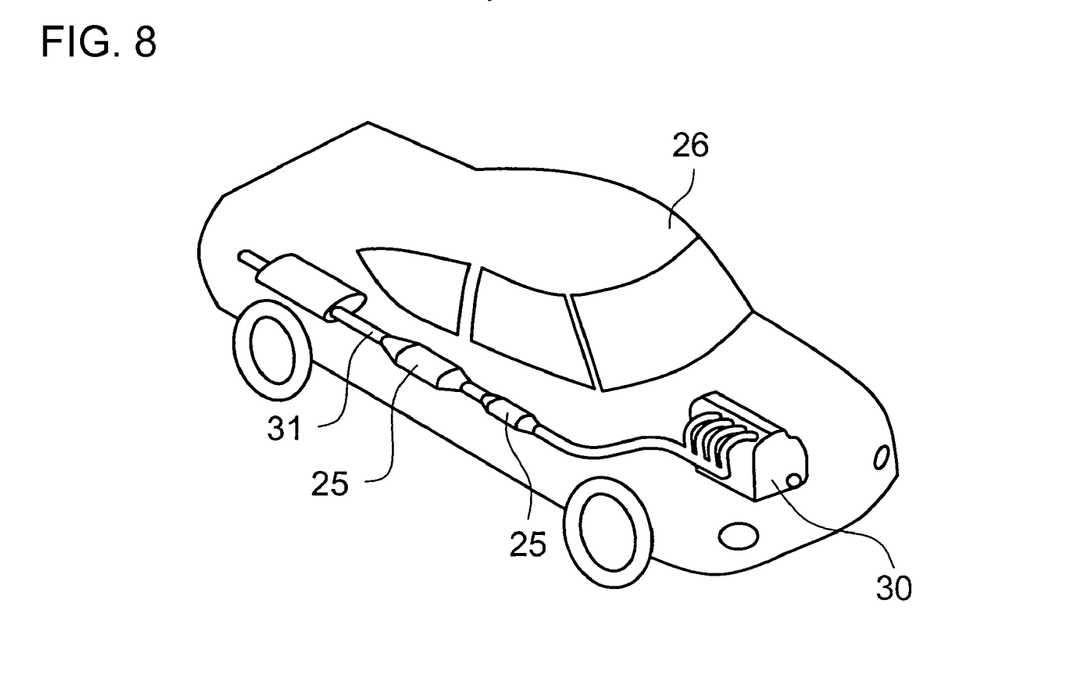
FIG. 8 is a perspective view of a vehicle having an exhaust-gas treatment unit.

FIG. 8 now illustrates a particularly preferred application area for the carrier body described herein as an exhaust-gas treatment unit 25 in a vehicle 26. The exhaust gas produced in an internal combustion engine 30 is passed through a corresponding exhaust system 31, during which process it flows, for example, through a plurality of exhaust-gas treatment units 25 having a carrier body of this type before ultimately being released to the environment in purified form. In addition to the application area illustrated, carrier bodies of this type can also be used for stationary combustion installations, machines, hand tools and the like.

Figure 9:
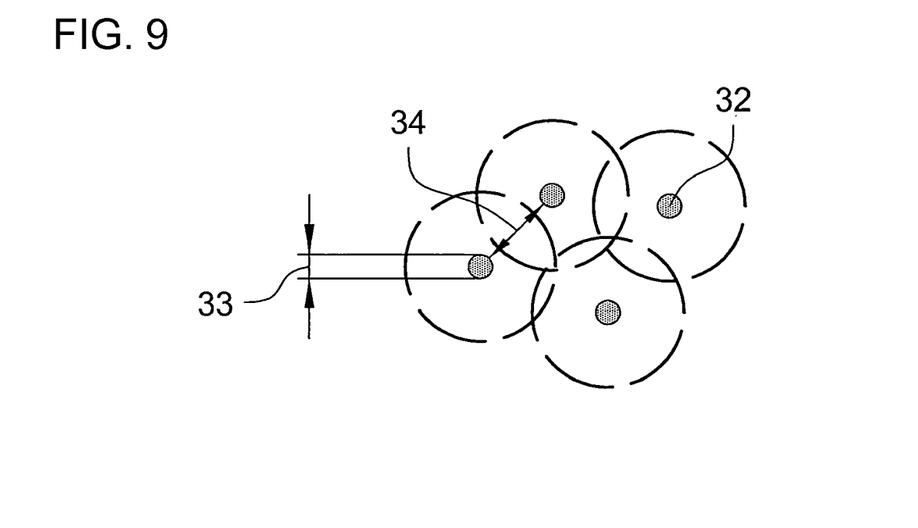
FIG. 9 is a plan view illustrating a dispersed distribution of catalyst elements on a surface.

FIG. 9 diagrammatically depicts a plan view illustrating a dispersed distribution of catalyst elements 32 on the overall surface 7 in the coating portion 8. The catalyst elements 32 are distributed in dispersed form on a surface of the carrier body 1, with the catalyst elements 32 having a mean size 33 of advantageously less than 10 nm. They are disposed at a spacing 34 from one another which is in a range larger than the size 33 of the catalyst element 32.

Figure 10:
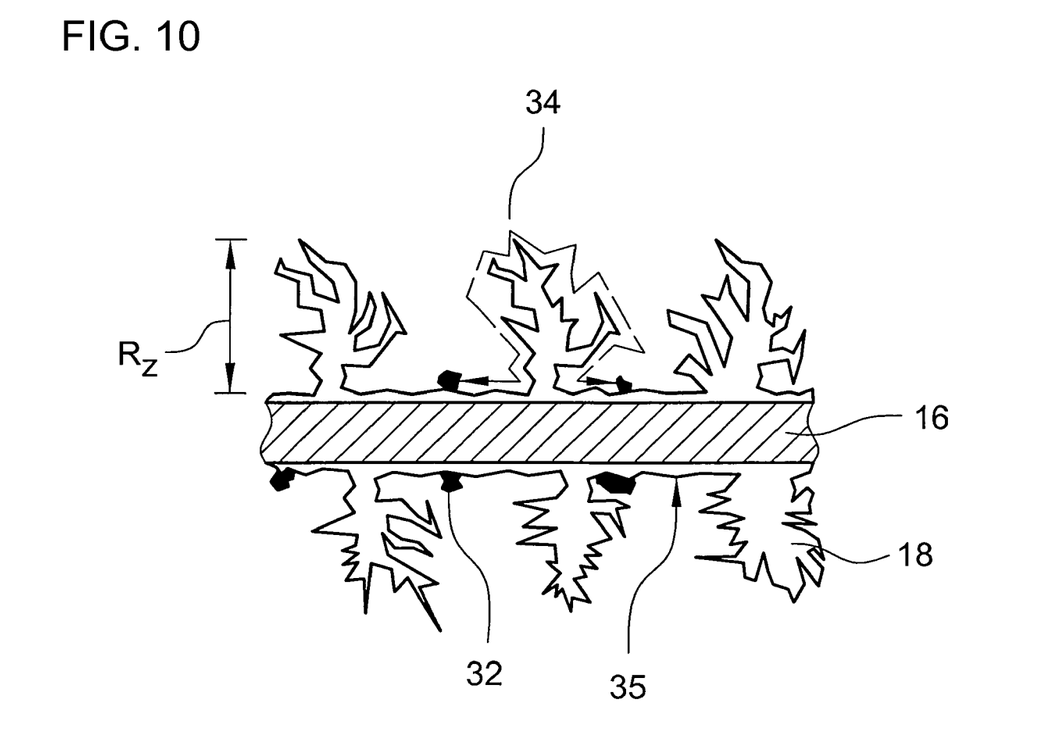
FIG. 10 is a fragmentary, cross-sectional view showing a further illustration of the dispersed distribution of the catalyst elements on the surface.

FIG. 10 again illustrates, in a different way, the dispersed configuration of the catalyst elements 32 with a mean spacing 34 along a surface region 35 which is to be at least 3 micrometers. Moreover, the surface region has a mean roughness depth $R_z$ of approximately 6 µm, which in this case is formed by a surface oxide 18 of a smooth stainless steel foil 16. The roughness profile according to the invention now ensures a sufficient spacing between the catalyst elements 32, so that even with the increased concentration of catalyst elements 32 on the surface region 35, these catalyst elements are prevented from fusing together, and efficient conversion of the exhaust-gas pollutants is ensured. Moreover, in addition to the improved conversion of pollutants, it is also possible to achieve additional advantages with regard to the production costs of a carrier body of this type, due to the reduced quantity of coating material. The surface region 35 is part of the overall carrier surface 7 which includes the coating portion 8 with the coating 2. The parameters of the coating elements apply at least to a part of the overall carrier surface 7 but at the end, if the carrier is completely provided with the coating, the surface region 35 corresponds to the overall carrier surface 7.

The invention claimed is:

1. A carrier body, comprising:
   an overall surface including a surface region having at least one coating portion with a catalytically active coating including at least one type of catalyst elements dispersed at said surface region of the carrier body;
   said catalyst elements having a mean spacing along said surface region of at least 3 micrometers;
   said surface region having a mean roughness depth $R_z$ of 2 to 10 micrometers;
   the carrier body having a maximum increase in pressure loss of 25% compared to a carrier body with a smooth and uncoated surface region; and
   at least one at least partially structured layer of a gas-impermeable material forming a multiplicity of flow paths with a minimum cross section of 0.5 square millimeters, at least a majority of said flow paths being constructed with a plurality of passages to at least one adjacent flow path.

2. The carrier body according to claim 1, wherein said catalyst elements are disposed in a quantity of 0.2 to 2.0 grams per square meter of said overall surface.

3. The carrier body according to claim 1, wherein said at least one type of catalyst elements includes a precious metal catalyst selected from the group consisting of platinum, palladium and rhodium.

4. The carrier body according to claim 1, wherein said catalyst elements have a mean size in a range of from 5 to 10 nanometers.

5. The carrier body according to claim 1, wherein said catalytically active coating of said at least one coating portion of said overall surface has a coating thickness of at most 15 micrometers.

6. The carrier body according to claim 1, which further comprises a surface boundary layer having a boundary layer thickness of at most 1 micrometer, and at least one precious metal catalyst selected from the group consisting of platinum, palladium and rhodium provided only in said surface boundary layer.

7. The carrier body according to claim 1, wherein said coating includes between 5 and 30 grams per square meter of a porous storage layer in said at least one coating portion.

8. The carrier body according to claim 1, which further comprises a fabric of wire filaments at least partially delimiting said flow paths.

9. The carrier body according to claim 8, wherein said at least one at least partially structured layer includes a stainless steel foil.

10. The carrier body according to claim 9, wherein at least one of said wire filaments or said stainless steel foil has a roughness depth $R_z$ in a range of from 2 to 6 micrometers in said at least one coating portion.

11. The carrier body according to claim 9, wherein at least one of said wire filaments or said stainless steel foil includes aluminum as a constituent formed as a surface oxide in said at least one coating portion.

12. The carrier body according to claim 9, which further comprises at least one precious metal catalyst selected from the group consisting of platinum, palladium and rhodium applied direct to at least one of said wire filaments or said stainless steel foil.

13. The carrier body according to claim 1, wherein each of said flow paths has a length and passages over said length at a repetition interval of at most 20 millimeters.

14. The carrier body according to claim 13, which further comprises guide surfaces associated with at least some of said passages and projecting into said flow paths.

15. The carrier body according to claim 1, wherein said flow paths have a length and are configured to cause a gas flowing through said flow paths to be turbulent over at least 80% of said length.

16. An exhaust-gas treatment unit, comprising at least one carrier body according to claim 1.

17. A vehicle, comprising at least one exhaust-gas treatment unit having at least one carrier body according to claim 1.

18. A process for producing a carrier body having an overall surface including at least one coating portion with a catalytically active coating, the process comprising the following steps:
   a) providing a carrier body having a smooth surface;
   b) determining a pressure loss in the carrier body under predetermined ambient conditions;
   c) providing the surface with a mean roughness depth in a range of from 2 to 10 micrometers causing the carrier body to experience a maximum increase in pressure loss of 25%;

d) placing catalyst elements in a dispersed configuration with a mean spacing along the surface of at least 3 micrometers; and e) providing at least one at least partially structured layer of a gas-impermeable material forming a multiplicity of flow paths with a minimum cross section of 0.5 square millimeters, at least a majority of said flow paths being constructed with a plurality of passages to at least one adjacent flow path.

19. The process according to claim 18, which further comprises carrying out step c) with at least one of the following steps:

c1) machining the surface;
c2) forming surface oxides;
c3) coating the surface;
c4) applying material to the surface using nanotechnology.

20. An exhaust-gas treatment unit, comprising a carrier body produced by the process according to claim 18.

21. A vehicle, comprising at least one exhaust-gas treatment unit having at least one carrier body produced by the process according to claim 18.

* * * * *